United States Patent
Wojcik

(10) Patent No.: US 6,358,134 B1
(45) Date of Patent: Mar. 19, 2002

(54) SKINNER BLADE

(75) Inventor: Frank A. Wojcik, Toledo, OH (US)

(73) Assignee: Crescent Manufacturing Company, Fremont, OH (US)

( * ) Notice: Subject to any disclaimer, the term of this patent is extended or adjusted under 35 U.S.C. 154(b) by 0 days.

(21) Appl. No.: 09/765,141

(22) Filed: Jan. 18, 2001

(51) Int. Cl.⁷ ............................................... A22B 3/10
(52) U.S. Cl. ................................................... 452/127
(58) Field of Search ................................. 452/127, 125

(56) References Cited

U.S. PATENT DOCUMENTS

| | | | |
|---|---|---|---|
| 2,081,807 A | 5/1937 | Gabriel | 146/121 |
| 3,083,922 A | 4/1963 | Enright et al. | 241/260 |
| 3,529,318 A * | 9/1970 | Jobmann | 452/127 |
| 3,542,105 A * | 11/1970 | Townsend | 452/127 |
| 3,739,428 A * | 6/1973 | Bartels et al. | 452/127 |
| 4,173,310 A | 11/1979 | Schaeffer | 241/282.1 |
| 4,230,007 A | 10/1980 | Grote et al. | 83/409.2 |
| 4,653,373 A * | 3/1987 | Gerber | 83/679 |
| 5,011,454 A | 4/1991 | Townsend | 452/125 |
| 5,122,091 A * | 6/1992 | Townsend | 452/127 |
| 5,288,264 A * | 2/1994 | Braeger | 452/127 |
| 5,566,602 A | 10/1996 | Dennis | 83/168 |
| 5,609,519 A * | 3/1997 | Townsend | 452/127 |
| 5,881,621 A | 3/1999 | Dennis | 83/168 |
| 5,983,507 A | 11/1999 | Hirai | 30/350 |
| 5,996,917 A | 12/1999 | Ehrle et al. | 241/292.1 |
| 6,148,702 A | 11/2000 | Bucks | 83/13 |

* cited by examiner

Primary Examiner—Peter M. Poon
Assistant Examiner—Joan Olszewski
(74) Attorney, Agent, or Firm—Shawnell Williams; John L. Gray

(57) ABSTRACT

A cutting blade made of surgical stainless steel with a very small angled back hone, a small grind angle, a small angled front hone, and a reduced size included angle, which has an increased hardness that results in a longer lasting narrow edge geometry blade that has a reasonable cost with increased durability and accuracy, providing greater cutting precision, productivity and net yields, while reducing the compression of the blade and processing downtime.

4 Claims, 2 Drawing Sheets

SKINNER BLADE

BACKGROUND OF THE INVENTION

The present invention relates to a cutting blade. More particularly, the present invention is directed to blades with unique cutting angles for cutting food products.

In the meat-processing business productivity and overall yield of a meat-processing plant depends on a number of factors including efficiency of the equipment being used, especially the quality and consistency of the blades utilized to cut or slice the meat. Varying blade characteristics affect their accuracy and determine their longevity. These characteristics depend on the blade's process of manufacture. The most relevant characteristics are the: sharpness, hardness, tolerances allowed for the blade edge angles, hone, finish, and grade of material used to make the blade. These are adjusted based on the application of the blade or the desired cost of the blade.

Generally, the blades are used in automated, high-speed skinning machines that are used to remove skin, membrane, or fat in meat, poultry, and fish processing plants. These machines utilize a conveyor that feeds the meat product into the skinning machine. During this process, the product is compressed by rollers and pulled over a plate (or shoe) onto which the blade is affixed. The skin, fat, or membrane is removed in a manner similar in function to that of a wood plane.

A typical meat-producing process is the removal of the skin on pork bellies before they undergo further processing in the production of bacon. A typical pork belly weighs about 14 pounds, and the skinning machine processes about one belly every 5 seconds. This amounts to about 168 pounds per minute or 80,000 pounds per shift, per machine. Two issues effect the production yield: 1) accuracy and consistency of the depth of the trim and 2) machine up-time. Using the example of the pork bellies, a weight deviation of just ¼ of 1% in trim weight can result in a gain or loss of 2,000 pounds per shift. Thus, with a typical price of $.80 per pound, that amounts to $1,600.00 per shift.

Traditionally, plants choose blades with certain basic characteristics. The problem with most of these blades is that they have loose tolerances, poor finish and hone, non-optimal edge angles, and non-optimal hardness. One way to increase sharpness and cutting precision of the blade is to use one with a narrow edge geometry, but this usually results in faster wear. When using these types of blades in the demanding environment of meat processing the normal result is a shortened blade life or damaged blades. The result is an increased expense because of both the use of more replacement blades and more frequent downtime of the plant leading to idled workers.

What is needed is a longer lasting narrow edge geometry blade that has a reasonable cost with increased durability and accuracy, so that productivity and net yield are increased while the compression of the blade and downtime are reduced.

SUMMARY OF THE INVENTION

This present invention overcomes all these above-mentioned shortcomings of the prior art devices.

According to the present invention there is provided a cutting blade with a very small angled back hone, a small grind angle, a small angled front hone, and a reduced size included angle, which has an increased hardness. This configuration allows for a "slippery" blade with increased precision and longevity.

Advantages of the blade design according to the present invention are that cutting is smoother, easier, and more precise, compression and downtime are reduced, and productivity and net yield are increased. This is brought about because the hone is ground wider than the prior art blades and the blade is highly polished to a mirror finish.

Another advantage of this blade design is that the stability under compressed product, and the combination of a break free edge, a narrow, slippery geometry, and a harder temper, results in a stable, consistent cut.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT(s)

Figure 1:
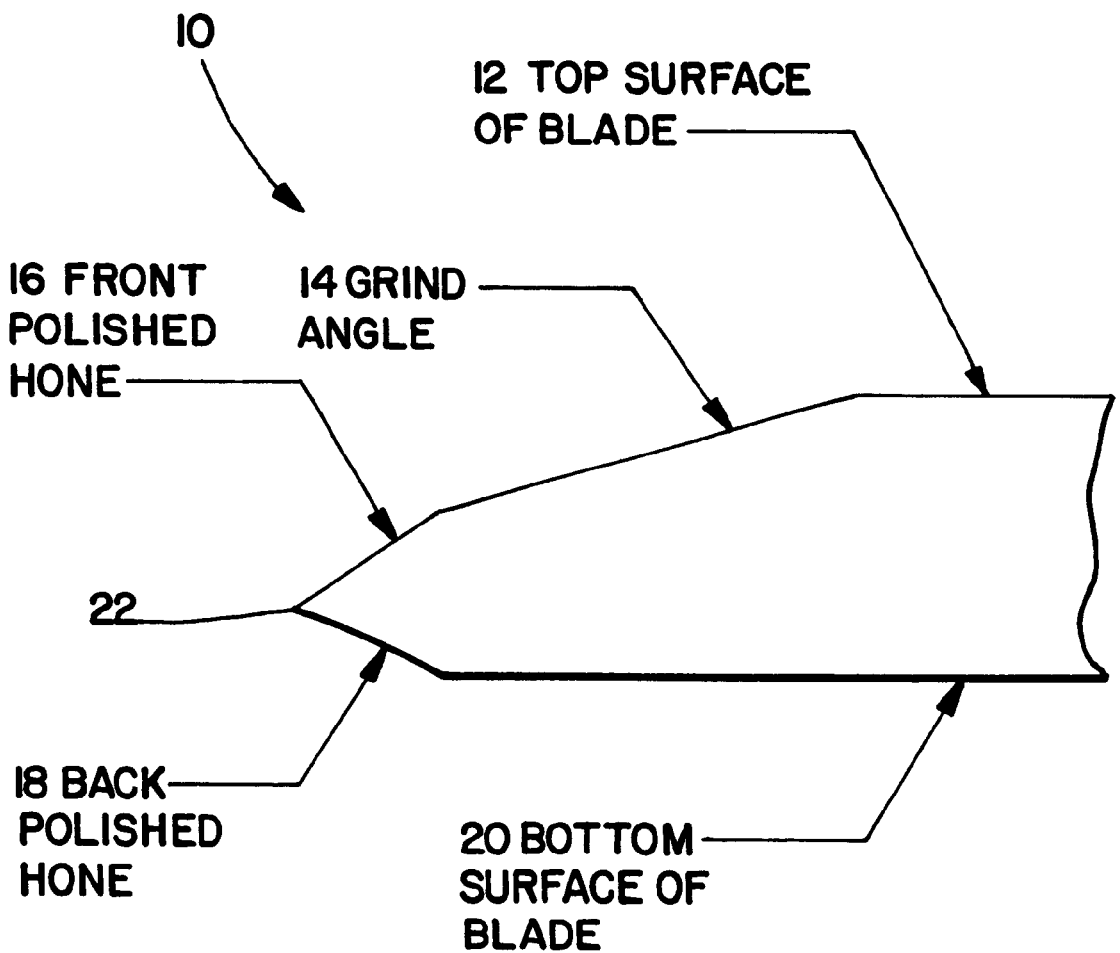
FIG. 1 illustrates a cross-section of a blade according to a preferred embodiment of the present invention.
Figure 2A:
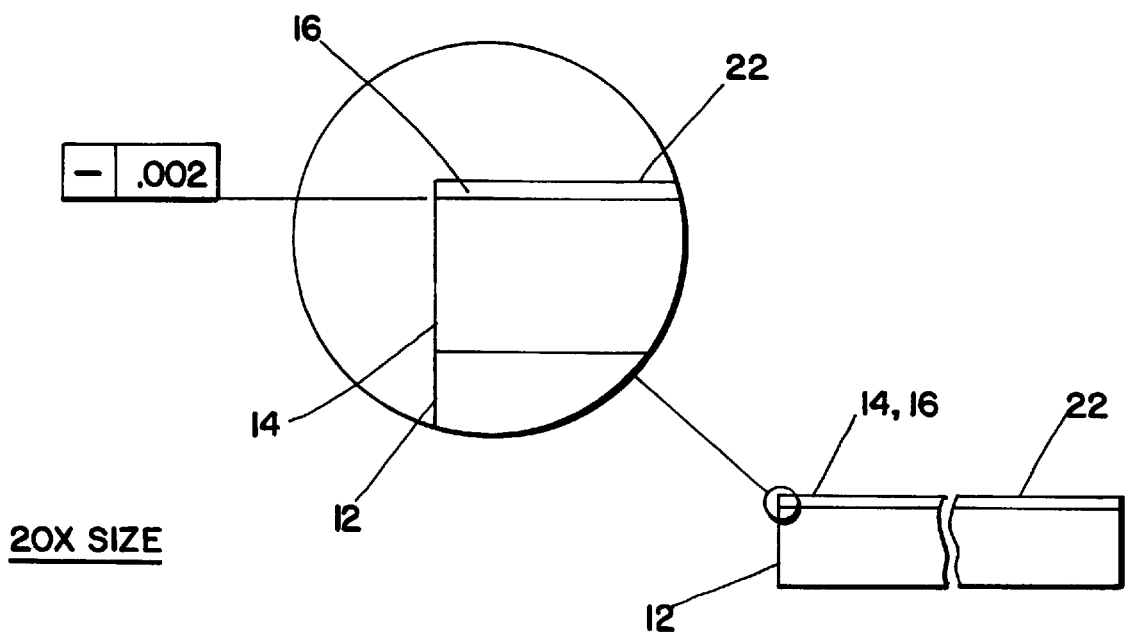
FIG. 2A illustrates a front view and magnified section view of the blade in FIG. 1.
Figure 2B:
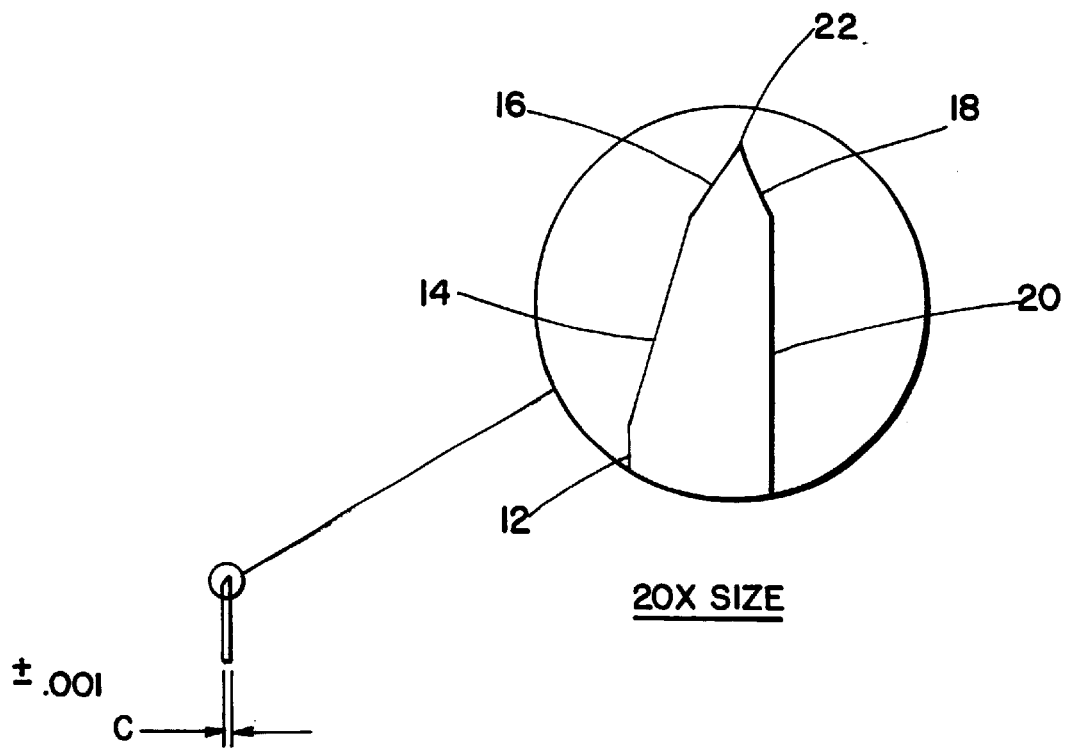
FIG. 2B illustrates a side view and magnified section view of the blade in FIG. 1.

As can be seen in FIGS. 1–2B, a cutting blade 10 according to a preferred embodiment of the present invention is shown. The cutting blade 10, which is preferably a skinner/derinder blade used in meat processing equipment, includes several surfaces. With reference to FIG. 1, the surfaces of the skinner blade 10 viewed counter-clockwise are a top surface 12, a grind angle surface 14, a front polished hone surface 16, a back polished hone surface 18, and a bottom surface 20.

Prior art devices generally have a hardness as measured on the Rockwell 30N scale of between 75 and 78, a back hone angle of 15–23°, a front hone angle of 16–23°, and an included angle of 31–46°, where an included angle is the sum of the degrees in the back and front hone angles. According to the preferred embodiment, the hardness of the skinner blade 10 is 79–80 on the Rockwell 30N scale, which allows for more blade life in tough applications. Also, in the preferred embodiment, the grind angle 14 is around 15–17°, the angle of the back polished hone 18 is around 7–8°, the angle of the front polished hone is around 18–19°, and an included angle is around 25–27°. This angle configuration is designed to make the skinner blade 10 "slippery".

Compared to the prior art configurations designed for general applications that provide good sharpness and toughness, the lower angle configuration of skinner blade 10 results in a more streamlined profile. The faster wear normally associated with a narrow edge geometry has been offset to some degree with the increased hardness of the blade, and a near perfect edge free of breakout, which are microscopic chips ranging in size from 0.5 to 3.0 microns. Also, during use the extremely low back polished hone surface 18 of skinner blade 10 sharply reduces the upward pressure associated with the applications where meat-product is brought in contact with the blade at high speed, while significant downward forces are exerted from the rollers.

The increased resistance caused by a blunter included angle may cause the edge 22 of the skinner blade 10 to roll upward, as pressure is exerted downward toward an inflexible steep surface. If this happens, the path of least resistance is upwards toward the mass of the meat-product since the product can be compressed. This causes the edge 22 of the skinner blade 10 to "roll" and quickly dull. The very low bottom/back polished hone angle 18 sharply reduces resistance on the bottom surface 20 of the skinner blade 10, keeping the edge 22 of the blade that contacts the meat product stable.

This skinner blade 10, according to a preferred embodiment of the present invention, is engineered to a highly critical geometry that is designed to reduce surface friction and resulting compression, which can result when processing thin, sticky meat membranes. When compared to the prior art blades, the longer taper of the double-angled cutting edge 22 and the high quality finish of the skinner blade 10 of the present invention, allow the blade to withstand an increased speed of operation of a meat-processing plant without affecting the blade's 10 useful life. During testing of the skinner blade 10, which was manufactured according to the instant invention, the blade withstood a lifetime of about two times the life of prior art blades operating under the same conditions. Since a blade change-out take about 5–6 minutes, if the skinner blade 10 lasts until the employees' break-time and lunch, in the high volume situations there would be no employee lost time due to the changing of the blades. In a contrast, prior art blades typically require replacement about every hour, so that in a normal production shift, four blades are changed on production time for a loss of at least 20 minutes, resulting in 3,400 pounds of lost production per shift.

In a preferred manufacturing process a preferable material for the skinner blade 10 is surgical grade stainless steel. Preferably, this material is precisely heat treated to ensure consistent hardness and grain structure, which results in a sharper edge 22 than prior art cutting instruments. The preferred manufacturing process then brings the treated material for skinner blade 10 through an exactly controlled grinding process that creates the engineered dual edge angle and then hones the final cutting edge 22 of skinner blade 10 to a mirror finish. Throughout this process there are constant quality checks to ensure the skinner blade 10 meets critical design specifications. The final stage in the manufacturing process is to lightly oil the skinner blade 10 in order to prevent corrosion and then package several, e.g., 5 or 100, of the blades for shipping.

This preferred method of manufacture produces consistent blade-to-blade quality and exceptional durability that allows the skinner blade 10 to be utilized in fast moving, high yield operations requiring minimum downtime for changing blades. This is accomplished because the hone is ground wider than the prior art blades, the blade 10 is highly polished to a mirror finish, and the blade 10 has a perfect, breakout-free edge. This blade 10 design provides stability under compressed product, and the combination of a break free edge 22, a narrow, slippery geometry, and a harder temper results in a stable, consistent cut.

From the above description of the invention, those skilled in the art will perceive improvements, changes and modifications in the invention. Such improvements, changes and modifications within the skill of the art are intended to be covered by the appended claims.

What is claimed is:

1. A cutting blade, comprising,
   (a) a surgical stainless steel blade having a hardness of 79 to 80 on the Rockwell 30N scale;
   (b) said blade having a top surface;
   (c) a grind angle surface of 15° to 17° connected to said top surface;
   (d) a front polished hone surface having an angle of 18° to 19° connected to said grind angle surface;
   (e) a back polished hone surface having an angle of 7° to 8° connected to said front polished hone surface and terminating in a sharp cutting edge; and
   (f) a bottom surface connected to said back polished hone surface.

2. A cutting blade comprising,
   (a) a steel blade;
   (b) said blade having a top surface;
   (c) a grind angle surface connected to said top surface;
   (d) a front polished honed surface having an angle of 18° to 19° connected to said grind angle surface;
   (e) a back polished hone surface connected to said front polished hone surface and terminating in a sharp cutting edge; and
   (f) a bottom surface connected to said back polished hone surface.

3. A cutting blade, comprising,
   (a) a steel blade;
   (b) said blade having a top surface;
   (c) a grind angle surface connected to said top surface;
   (d) a front polished hone surface connected to said grind angle surface;
   (e) a back polished hone surface having an angle of 7° to 8° connected to said front polished hone surface and terminating in a sharp cutting edge; and
   (f) a bottom surface connected to said back polished hone surface.

4. A cutting blade, comprising,
   (a) a steel blade;
   (b) said blade having a top surface;
   (c) a grind angle surface of 15° to 17° connected to said top surface;
   (d) a front polished home surface connected to said grind angle surface;
   (e) a back polished hone surface connected to said front polished hone surface and terminating in a sharp cutting edge; and
   (f) a bottom surface connected to said back polished hone surface.

* * * * *